US008290246B1

(12) United States Patent
Schairer et al.

(10) Patent No.: US 8,290,246 B1
(45) Date of Patent: Oct. 16, 2012

(54) PHOTOGRAMMETRIC RECESSION MEASUREMENTS OF AN ABLATING SURFACE

(75) Inventors: Edward T. Schairer, Palo Alto, CA (US); James T. Heineck, San Jose, CA (US)

(73) Assignee: The United States of America as Represented by the Administrator of the National Aeronautics & Space Administration (NASA), Washington, DC (US)

( * ) Notice: Subject to any disclaimer, the term of this patent is extended or adjusted under 35 U.S.C. 154(b) by 1292 days.

(21) Appl. No.: 11/958,296

(22) Filed: Dec. 17, 2007

(51) Int. Cl.
*G06K 9/00* (2006.01)
(52) U.S. Cl. .......................... 382/154; 348/47; 356/601
(58) Field of Classification Search .................. 382/154; 348/47; 356/601, 603
See application file for complete search history.

(56) References Cited

U.S. PATENT DOCUMENTS

| | | | | |
|---|---|---|---|---|
| 6,542,249 | B1* | 4/2003 | Kofman et al. | 356/601 |
| 6,585,146 | B2* | 7/2003 | Shepard | 228/104 |
| 6,937,348 | B2* | 8/2005 | Geng | 356/603 |
| 7,545,516 | B2* | 6/2009 | Jia et al. | 356/603 |
| 7,667,767 | B2* | 2/2010 | Perlman | 348/371 |
| 2005/0046873 | A1* | 3/2005 | Suzuki | 356/605 |
| 2005/0071105 | A1* | 3/2005 | Welles et al. | 702/85 |
| 2007/0229850 | A1* | 10/2007 | Herber | 356/604 |
| 2008/0287929 | A1* | 11/2008 | Holliday et al. | 606/5 |
| 2010/0054579 | A1* | 3/2010 | Okutomi et al. | 382/154 |

OTHER PUBLICATIONS

Bell, et al., Image Registration for Pressure-Sensitive Paint Applications, Experiments in Fluids, Nov. 1996, 78-86, 22-1.
Bell, et al., Surface Pressure Measurements Using Luminescent Coatings, Annual Review of Fluid Mechanics, 2001, 155-206, 33.
Brooks, et al., Measurements of Model Aeroelastic Deformations in the Wind Tunnel at Transonic Speeds Using Stereophotogrammetry, Oct. 1977, NASA TM 1010.
Karara, et al., Accuracy Aspects of Non-metric Imageries, Photogrammertric Engineering, 1974, 1107-1117, 40-7.
Lavelle, et al., High Speed 3D Scanner with Real-Time 3D Processing, IEEE IST 2004 International Workshop on Imaging Systems and Techniques, May 14, 2004, Stresa, Italy.
Martinez, et al., Current Developments in Future Planetary Prob . . . , International Workshop Planetary Probe Entry and Descent Trajectory Analysis and Science, Oct. 6-9, 2003.
Milos, et al., Galileo Probe Heat Shield Ablation Experiment, Journal of Spacecraft and Rockets, Nov.-Dec. 1997, 705-713, 34-6.
Raffel, et al., Particle Image Velocimetry, A Practical Guide, 1998, Springer-Verlag, Berlin.
Schairer, et al., Photogrammetric Recession Measurement of Ablative Materials During Arcj . . . , 45th AIAA Aerospace Sciences Meeting and Exhibit, Jan. 8-11, 2007, Reno, Nevada.
Schairer, et al., Photogrammetric Recession Measurement of Ablative Materials in the NASA Ames Sixty-Megawatt Arcjet, 22nd ICIASF, Jun. 10-14, 2007, IEEE, Pacific Grove, CA.

(Continued)

*Primary Examiner* — Gregory M Desire
(74) *Attorney, Agent, or Firm* — John F. Schipper; Robert M. Padilla (57) ABSTRACT

An instrument and method for measuring the time history of recession of an ablating surface of a test article during testing in a high enthalpy thermal test facility, such as an arcjet. The method advances prior art by providing time-history data over the full ablating surface without targets and without any modifications to the test article. The method is non-intrusive, simple to implement, requires no external light source, and does not interfere with normal operations of the arcjet facility.

9 Claims, 8 Drawing Sheets

OTHER PUBLICATIONS

Soloff, et al., Distortion Compensation for Generalized Stereoscopic Particle Image Ve . . . , Measurement Science and Technology, Dec. 1997, 1441-1454, 8-12, IOP Publishing Ltd.

Weeks, Fundatmentals of Electronic Image Processing, SPIE Optical Engineering Press, 1996, Bellingham, WA.

Willert, Steroscopic Digital Particle Image Velocimetry for Application in Wind Tunnel Flows, measurement Science and Technology, Dec. 1997, 1465-1479, 8-12.

* cited by examiner

PHOTOGRAMMETRIC RECESSION MEASUREMENTS OF AN ABLATING SURFACE

ORIGIN OF THE INVENTION

The invention described herein was made by employees of the National Aeronautics and Space Administration and it may be manufactured and used by and for the United States Government for governmental purposes without the payment of royalties thereon.

TECHNICAL FIELD OF THE INVENTION

The present invention relates to the general field of measuring changes in shape over time of a textured surface that has no targets or fiducial marks and the appearance of which changes over time. The invention relates in particular to a method and apparatus for measuring the rate at which ablative materials erode or recede as they are tested in a high enthalpy thermal test facility, collectively referred to herein as an "arcjet" facility. The method provides the time history of recession at each of many points distributed over the surface of the test article. The density and distribution of measurement points can be arbitrarily chosen during post-test data analysis. The measurement points do not need to be marked on the test article, and no modifications to the test article are required.

DESCRIPTION OF THE PRIOR ART

Spacecraft that enter the atmosphere of the Earth or other planets are subjected to intense heating due to the high speed of entry and friction with the atmosphere. Thermal protection systems (TPSs) shield the spacecraft from this intense heat. Ablators are one type of TPS that are designed to erode as they are heated, thus carrying away from the spacecraft much of the heat of atmospheric entry. Knowing the rate at which TPS materials ablate or recede is critical both to the design of a spacecraft's TPS and to the development of computational methods for predicting TPS performance.

TPS materials are tested in thermal test facilities, such as an arcjet, that approximate the high-enthalpy flows that TPS materials experience during atmospheric entry. Prior techniques for measuring ablation of TPS materials in arcjets include: (1) the "direct" method, whereby recession is determined by comparing the thickness of the test article before and after testing; and (2) embedding electrical sensors in the test article and monitoring sensor output as a function of time. The direct method, discussed in Lavelle, J. P., Schuet, S. R., Schuet, D. J., "High Speed 3D Scanner with Real-Time 3D Processing," IEEE IST 2004-International Workshop on Imaging Systems and Techniques, Stresa, Italy, May 14, 2004, only provides a measurement, averaged over time, without any information about how the ablation rate varies with time. In addition, the direct measurement is made after the test article has cooled, whereas ablation occurs while the test article is hot.

Embedded sensors only provide measurements at the sensor locations and usually track an isotherm that may not recede at the same rate as the ablator surface. Sensors also require modifying the test article to accommodate them, and electrical wiring to the sensor must also be accommodated. The presence of the sensor can alter the local recession of the test article, and the sensor itself may recede at a different rate than the surface in which it is embedded. Embedded sensors have been used to measure the ablation of heat shields of spacecraft that have entered the atmospheres of other planets. See, for example, Milos, F. S., "Galileo Probe Heat Shield Ablation Experiment," Journal of Spacecraft and Rockets, Vol. 34, No. 6, November-December 1997, pp. 705-713, and Martinez, E., Venkatapathy, E., and Oishi, T., "Current Developments in Future Planetary Probe Sensors for TPS," Proceedings of the International Workshop Planetary Probe Entry and Descent Trajectory Analysis and Science, Lisbon, Portugal, Oct. 6-9, 2003.

Time-varying ablation can occur in a variety of circumstances including: start-up transients; failure of the material ("burn-through"); time-varying test conditions; and multiple insertions of the test article during a single run. Complex TPS materials, for example, those with variable density and/or multiple layers, are likely to exhibit nonlinear recession even at constant test conditions.

Knowing how surface recession varies with time is critical to understanding the behavior of TPS materials. A method is needed that measures the time history of recession at arbitrarily many points distributed over the face of the test article. Ideally, the method would be non-intrusive and would not require an external light source or any modification to the test article. The method should also have the potential to provide measurements in real or near-real time.

SUMMARY OF THE INVENTION

These needs are met by the invention, which yields the time history of recession at many points distributed over the face of a test article for the full time that the article is exposed to an arcjet flow. A version of this approach is discussed in Schairer, E. T. and Heineck, J. T., "Photogrammetric Recession Measurement of Ablative Materials During Arcjet Testing," AIAA paper 2007-1158, Jan. 8-11, 2007, and in Schairer, E. T. and Heineck, J. T., "Photogrammetric Recession Measurements of Ablative Materials in the NASA Ames Sixty-Megawatt Arcjet," presented at $22^{nd}$ International Congress on Instrumentation in Aerospace Simulation Facilities (ICIASF), Pacific Grove, Calif., Jun. 10-14, 2007). The invention is non-intrusive and does not require an external light source or any modifications to the test article. The principal requirements are: (1), the surface of the test article must exhibit some texture; (2), the surface must be imaged from at least two independent directions by synchronized, high-resolution video cameras; and, (3), the imaging rate must be high enough that features on the surface of the test article appear similar in successive images.

During a test or run, two synchronized video cameras image the face of the test article from different directions, either directly or as reflected in mirrors, for the full time that the test article is exposed to an arcjet flow. Before or after the test or run the cameras are calibrated in place by substituting a reference object for the test article and imaging it with both cameras. The reference object has many fiducial marks or targets on its surface, and the three-dimensional object-space coordinates (x,y,z) of each target is precisely known. The analyst locates these targets in the images of both cameras. The two-dimensional image-plane coordinates (X, Y, e.g., horizontal and vertical pixel locations) of these targets, together with the known 3D object-space coordinates are used to compute, for each camera, an approximate transformation between 2D image-plane and 3D object-space coordinates.

Recession measurements are made after a test or run is complete by analyzing the sequence of images from both cameras. The analyst first defines selected points on the surface of the test article where recession measurements are to be made. This is done by constructing, in 3D object-space, a mathematical surface grid that conforms to the shape of the test article at the beginning of the run. Each node of the surface grid is a measurement point. The density and distribution of measurement points can be arbitrarily chosen, and no targets or fiducial marks are required. This is a significant advance over prior art, which uses embedded sensors, where measurement points are restricted to the positions of the sensors, and it is not practical to embed large numbers of sensors in the test body. It is also an advance over conventional photogrammetry, where well-defined targets or fiducial marks are required. The analyst then uses the transformation from 3D object-space to 2D image-plane coordinates to map the surface grid into the first image from each camera. This approach defines, for each camera, the 2D image-plane coordinates of each measurement point.

After the measurement points have been defined in the first image from each camera, the measurement points are tracked throughout the sequence of images from both cameras. For one of the cameras, this is accomplished by cross correlation of successive images. Beginning with the first image in the sequence, a small rectangular interrogation window is defined with its center at the first measurement point. Image intensity data within this window from the first and second images are cross-correlated. If the first and second images are similar within the correlation window, the resulting correlation function will have a well-defined peak that is offset from the center of the correlation window by the local 2D image-plane offset of the second image relative to the first image. Therefore, the position of the correlation peak can be used to determine the local offset of the second image relative to the first, and this offset is used to update the position of the measurement point in the second image. Differences between the first and second images within the window, other than an offset, appear as noise in the correlation function.

After this procedure has been applied at the first measurement point, it is repeated at all other measurement points using data from the first and second images within interrogation windows centered on each measurement point. Image-plane coordinates of the measurement points in the third (and each subsequent) image are determined by stepping forward one image in the sequence and repeating the procedure at each point. After stepping through all the images, this procedure yields the image-plane coordinates of every measurement point in every image in the sequence from one camera.

A different procedure is used to locate measurement points in the images from the second camera. This is necessary to enforce or implement the requirement that corresponding measurement points in the images from the two cameras correspond to the same object-space point on the model (i.e., a measurement point in the image from one camera must lie on the same surface feature of the test article in the corresponding image from the other camera). To accomplish this, intensity data from each image from the second camera are cross correlated with data from the corresponding image from the first camera and not with the next image from the second camera.

If raw image data from the two cameras are cross-correlated directly, the correlation function is swamped by noise due to differences in perspective between the two cameras, i.e., the images of the model do not appear similar, due to differences in perspective, even when both images show the same features of the model. Therefore, images from both cameras are "de-warped" to minimize differences in perspective before the images are cross correlated. At each measurement point, the de-warping function creates a view of the local surface of the model as if it were seen from directly overhead. The displacement of the peak of the cross correlation function of the de-warped images yields the relative offset between images from the first and second cameras in de-warped image coordinates. The position of the measurement point in raw image-plane coordinates of the second camera is found by applying the inverse of the local de-warp transformation to the coordinates of the point in de-warped image space.

After all measurement points have been located in corresponding images from the two cameras, the 3D object-space coordinates of the points are computed from the 2D image-plane coordinates and the camera calibration coefficients. This yields the instantaneous 3D shape of the surface of the model. Repeating this calculation for each pair of images in the image sequences from the two cameras yields the time-history of the shape of the surface. Recession is usually defined either as the displacement of the surface in the direction normal to the surface or in the direction parallel to the arcjet longitudinal axis.

BRIEF DESCRIPTION OF THE DRAWINGS

The above and other features of the present invention and the manner of attaining them, will become apparent, and the invention itself will be best understood, by reference to the following description and the accompanying drawings, wherein.

DESCRIPTION OF THE INVENTION

Figure 1:
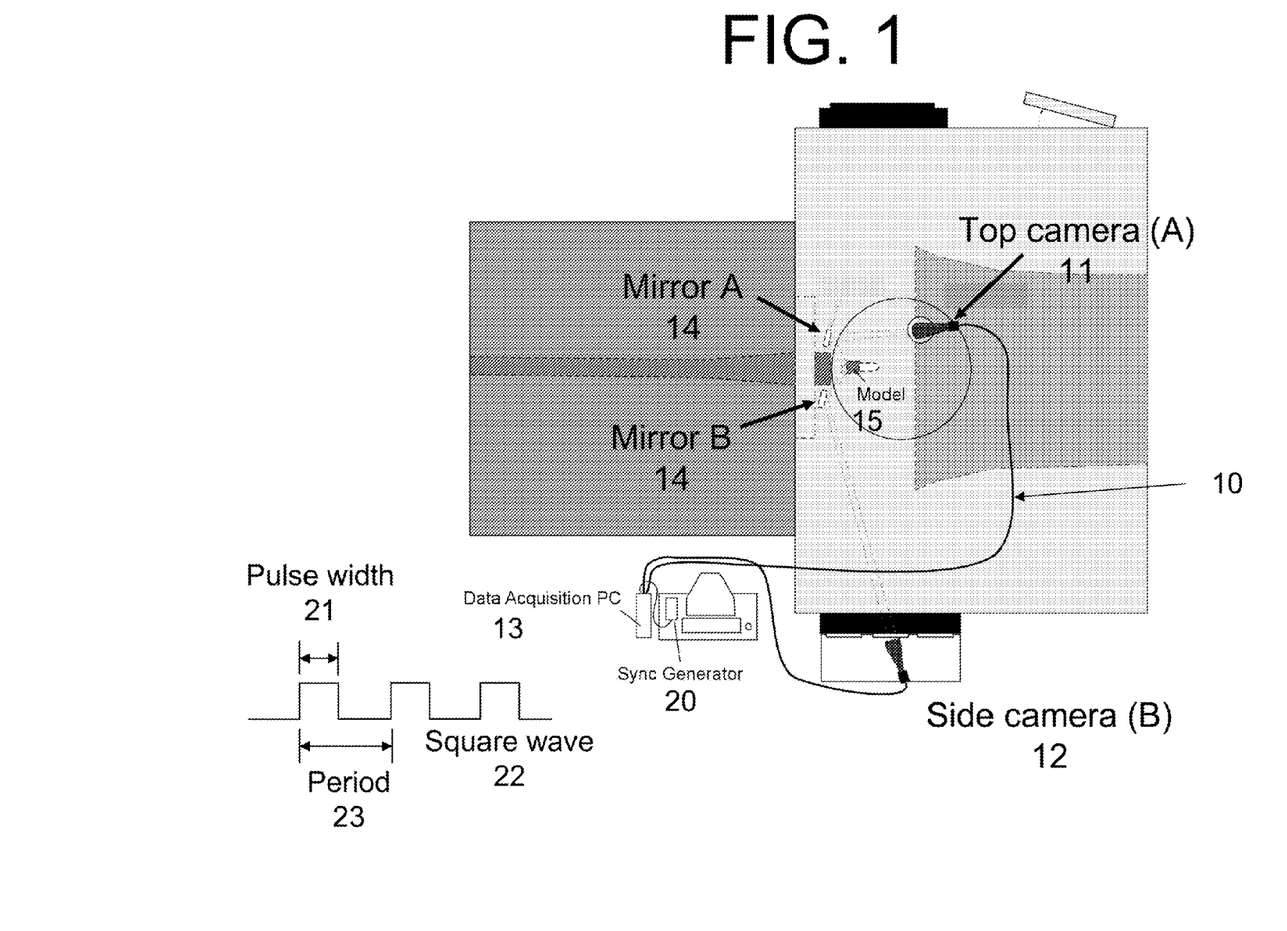
FIG. 1 is a schematic plan view of an arcjet facility showing the placement of cameras and mirrors that allows imaging the test article from two directions.

FIG. 1 illustrates a Photogrammetric Recession Measurement (PRM) instrument 10 constructed according to the present invention and shown during use in an arcjet facility for measuring the recession time history of a sample of Thermal Protection System material ("test article"). The instrument generally includes two synchronized high-resolution video cameras, 11 and 12, and a computer or processor 13. The instrument may also include mirrors 14 mounted inside the test cabin that reflect light from the face 27 of the test article 15 to the cameras, 11 and 12.

Figure 2:
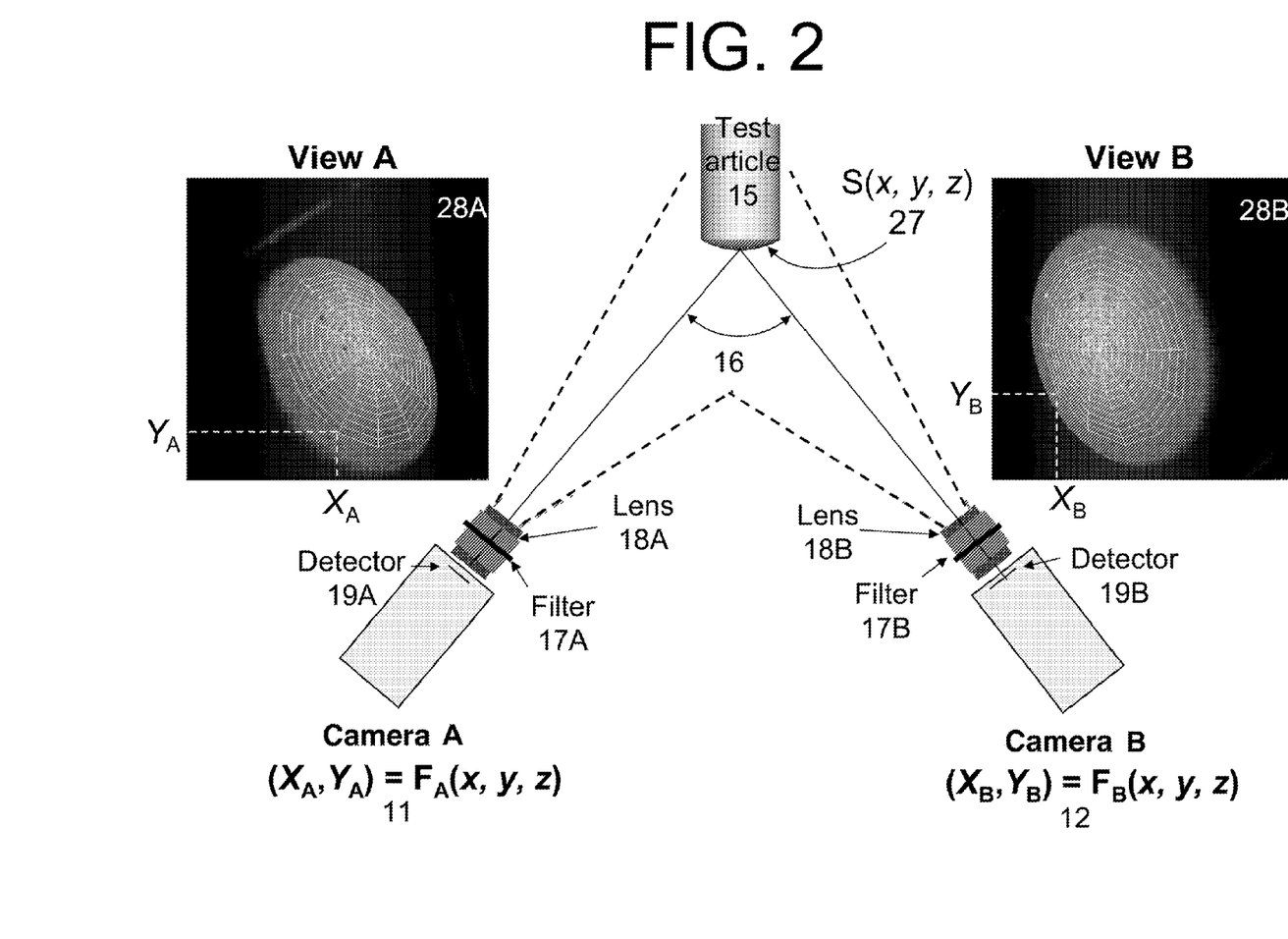
FIG. 2 is a schematic drawing that shows the test article, cameras, typical images, and a surface grid of nodes that defines measurement points.

FIG. 2 shows schematically the relative positions of the test article 15 and the cameras (11 and 12). The cameras, 11 and 12, and mirrors 14 must be positioned so that each camera views the face 27 of the test article 15 from a different direction (28A, 28B). Ideally, the difference in direction between the camera viewing angles 16 should be 90 degrees; however, differences in viewing angles significantly greater than or less than this optimum can also be used.

The cameras, 11 and 12, are digital and record images at a pre-determined rate. This rate must be high enough that features on the surface 27 of the test article 15, which continually change as the test article ablates, appear similar in successive images from each camera. The imaging rate (e.g., 1-1000 Hz) may be set using the computer software that operates the cameras. Alternatively, the imaging rate may be set by an external device such as a digital signal (sync) generator 20, where the camera imaging frequency is set to the frequency (the inverse of the period 23) of a square wave 22 from the signal generator 20. The spatial resolution of the cameras, 11 and 12, must be high enough to resolve texture on the surface $S(x,y,z)$ 27 of the test article 15.

The cameras, 11 and 12, must be fitted with filters, 17A and 17B, to attenuate the intense light from the hot test article 15. The preferred method for attenuating the light is to place a narrow (e.g., 10-nm) band-pass interference filter, 17A and 17B, in the light path of the camera. The filters, 17A and 17B, may be inserted before the lenses, 18A and 18B, or between the lens and the camera detectors, 19A and 19B. A neutral-density filter may be used instead of a band-pass filter, however this usually results in images with inferior contrast and sharpness due to chromatic aberration. Lenses of the cameras must be stopped down to provide sufficient depth of field that the surface of the test article remains in focus as the surface recedes. Preferably, the camera integration time or exposure is set so that the brightest parts of the test article approach, but do not exceed, the saturation level of the cameras. It may be necessary to adjust the camera exposure during a run as the brightness of the test article changes. The camera exposure may be set either automatically, using automatic gain control, or manually using the camera-control software. Alternatively, the exposure may be set using an external device such as a digital signal (sync) generator 20, where the exposure is set to the width of pulses 21 of a square wave 22. The cameras must have sufficient dynamic range to resolve differences in brightness both in the brightest and dimmest regions on the surface of the test article. Eight to ten bits of dynamic range (256:1 to 1024:1) are usually adequate, but more bits can be used if desired.

Figure 3:
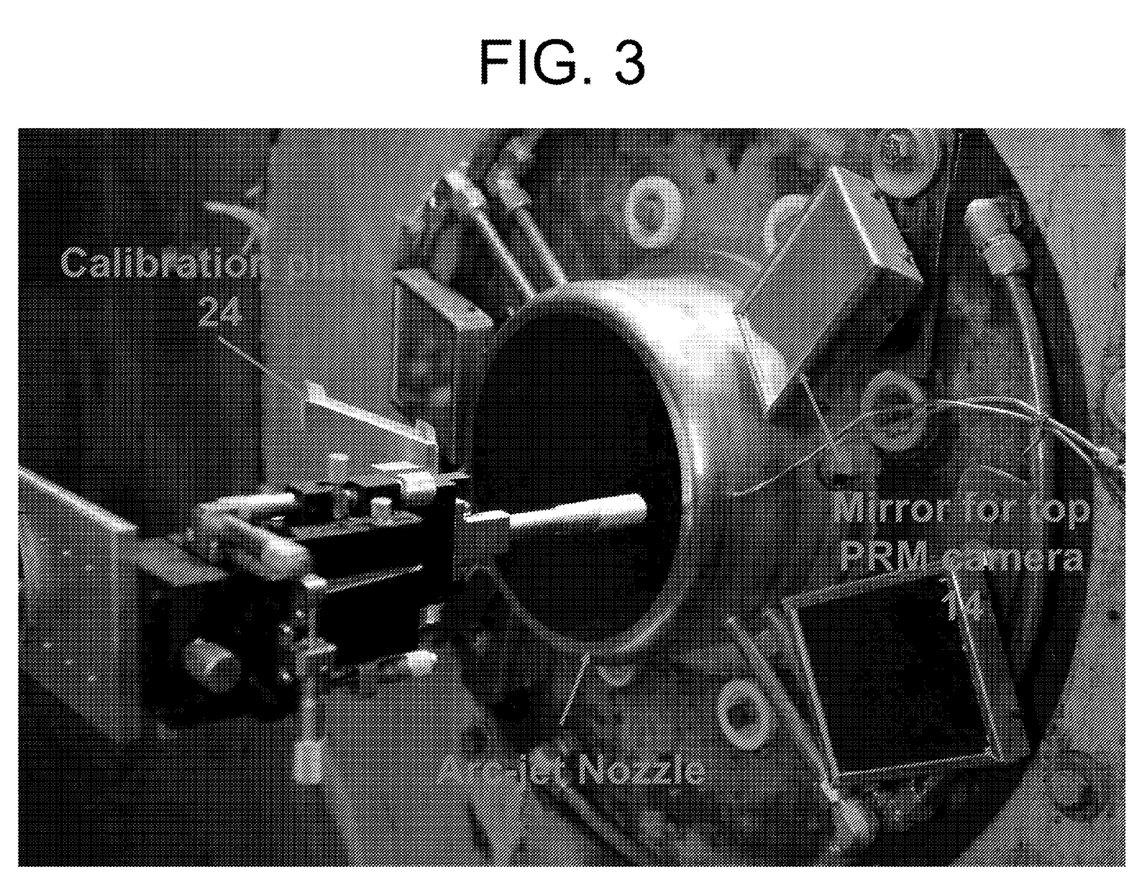
FIG. 3 is a photograph inside the test cabin of an arcjet showing the relative positions of the arcjet nozzle, mirrors used to view the test article, and a calibration plate used to calibrate the cameras.

The cameras, 11 and 12, are calibrated in place either before or after a test by replacing the test article 15 with a calibration object 24 and imaging the object with both cameras. FIG. 3 is a photograph showing a calibration object 24 installed at the position of the test article. The calibration object 24 must have marks or targets 25 (FIGS. 4A-4B) on its surface, and the relative 3D object-space coordinates of these targets must be known. If the targets 25 do not all lie in the same plane, a single image of the calibration object from each camera is sufficient to calibrate that camera. If all of the targets 25 lie in the same plane (e.g., the calibration object is a flat plate), then at least two images of the calibration object must be acquired with each camera, with the object displaced by a small, precisely known distance in the out-of-plane (normal) direction.

Before calibration images are acquired, the cameras are focused so that targets on the calibration object are in sharp focus. Focusing is made easier if the surface of the calibration object exhibits fine texture, for example, if an aluminum surface is bead blasted. During focusing, the calibration object should be illuminated by light of the same wavelength as the pass wavelength of the band-pass filters, 17A and 17B.

During a typical arcjet run, the test article is held outside of the open jet of the arcjet until the desired test conditions have been established. The test article is then inserted into the jet for a prescribed period of time and then withdrawn. The PRM cameras, 11 and 12, begin recording images just before the test article is inserted into the jet and stop recording after the test article has been removed from the jet. All images from both cameras are written to either an internal or external storage device of the computer as the images are acquired.

Figure 4A:
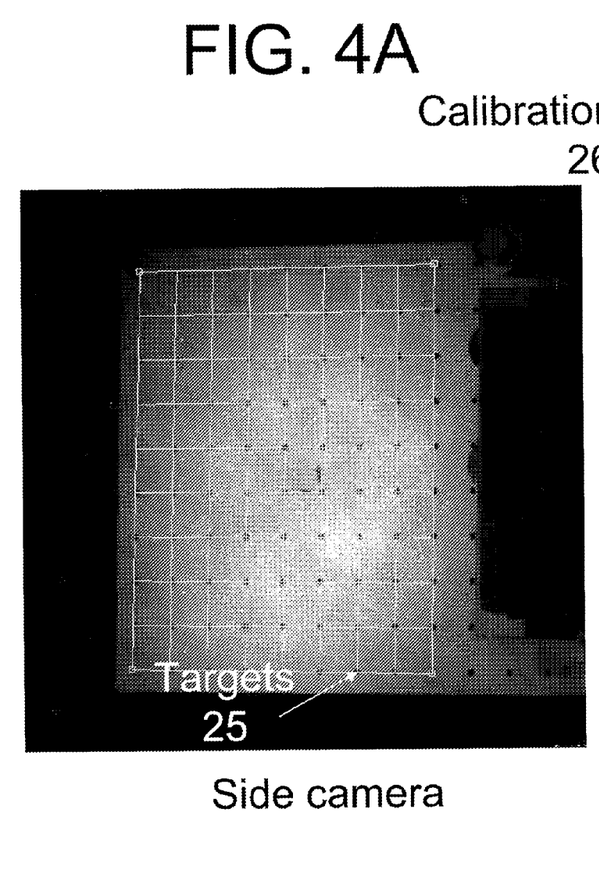
FIGS. 4A-4B show typical images of a two-dimensional calibration plate.
Figure 4B:
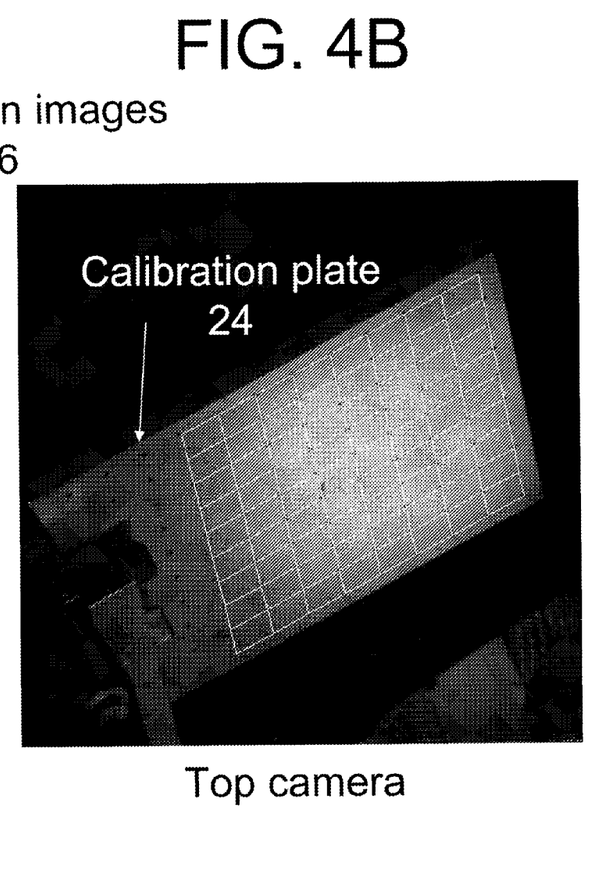

Before images of the test article can be analyzed, the camera calibrations must be computed from images of the calibration object. FIGS. 4A-4B show typical calibration images 26 of a calibration plate 24. The calibration of each camera is computed by first determining the 2D image-plane coordinates of each target 25 in the calibration images 26. This is accomplished using special-purpose software that reads each image and allows the analyst to locate the targets either manually or automatically. The analyst manually locates targets by using a computer mouse to point and click on each target. The analyst automatically locates targets 25 by using a target-finder that uses differences in brightness between the targets and the background to establish the target positions.

After the 2D image-plane coordinates of the calibration targets have been determined, coefficients of a transformation from 3D object-space to 2D image-plane are computed from these coordinates and the known 3D object-space coordinates of the targets. Various forms of the object-space-to-image-plane transformation may be used, including polynomial transformations commonly used in Particle Image Velocimetry; see Soloff, S. M., Adrian, R. J., and Liu, Z-C, "Distortion Compensation for Generalized Stereoscopic Particle Image Velocimetry," Measurement Science and Technology, Vol. 8, No. 12, December 1997, pp. 1441-1454. The preferred transformation for the present invention is the Direct Linear Transformation (DLT), as discussed in Karara, H. M., and Abdel-Aziz, Y. I., "Accuracy Aspects of Non-metric Imageries," Photogrammetric Engineering, Vol. 40, No. 7, 1974, pp. 1107-1117:

$$X = \frac{L_1 x + L_2 y + L_3 z + L_4}{L_9 x + L_{10} y + L_{11} z + 1} \qquad (1)$$

$$Y = \frac{L_5 x + L_6 y + L_7 z + L_8}{L_9 x + L_{10} y + L_{11} z + 1}$$

where (x y z) and (X,Y) are the object-space and image-plane coordinates of a target, respectively. The eleven calibration coefficients ($L_1$-$L_{11}$) for each camera are determined from the image-plane and object-space coordinates of at least six targets, as discussed in Brooks, J. D., and Beamish, J. K., "Measurements of Model Aeroelastic Deformations in the Wind Tunnel at Transonic Speeds Using Stereophotogrammetry," NASA TM 1010, October 1977:

$$\begin{bmatrix} x_1 & y_1 & z_1 & 1 & 0 & 0 & 0 & 0 & X_1 x_1 & X_1 y_1 & X_1 z_1 \\ x_2 & y_2 & z_2 & 1 & 0 & 0 & 0 & 0 & X_2 x_2 & X_2 y_2 & X_2 z_2 \\ x_3 & y_3 & z_3 & 1 & 0 & 0 & 0 & 0 & X_3 x_3 & X_3 y_3 & X_3 z_3 \\ x_4 & y_4 & z_4 & 1 & 0 & 0 & 0 & 0 & X_4 x_4 & X_4 y_4 & X_4 z_4 \\ x_5 & y_5 & z_5 & 1 & 0 & 0 & 0 & 0 & X_5 x_5 & X_5 y_5 & X_5 z_5 \\ x_6 & y_6 & z_6 & 1 & 0 & 0 & 0 & 0 & X_6 x_6 & X_6 y_6 & X_6 z_6 \\ 0 & 0 & 0 & 0 & x_1 & y_1 & z_1 & 1 & Y_1 x_1 & Y_1 y_1 & Y_1 z_1 \\ 0 & 0 & 0 & 0 & x_2 & y_2 & z_2 & 1 & Y_2 x_2 & Y_2 y_2 & Y_2 z_2 \\ 0 & 0 & 0 & 0 & x_3 & y_3 & z_3 & 1 & Y_3 x_3 & Y_3 y_3 & Y_3 z_3 \\ 0 & 0 & 0 & 0 & x_4 & y_4 & z_4 & 1 & Y_4 x_4 & Y_4 y_4 & Y_4 z_4 \\ 0 & 0 & 0 & 0 & x_5 & y_5 & z_5 & 1 & Y_5 x_5 & Y_5 y_5 & Y_5 z_5 \\ 0 & 0 & 0 & 0 & x_6 & y_6 & z_6 & 1 & Y_6 x_6 & Y_6 y_6 & Y_6 z_6 \end{bmatrix} \times \begin{bmatrix} L_1 \\ L_2 \\ L_3 \\ L_4 \\ L_5 \\ L_6 \\ L_7 \\ L_8 \\ L_9 \\ L_{10} \\ L_{11} \end{bmatrix} = \qquad (2)$$

$$\begin{bmatrix} -X_1 \\ -X_2 \\ -X_3 \\ -X_4 \\ -X_5 \\ -X_6 \\ -Y_1 \\ -Y_2 \\ -Y_3 \\ -Y_4 \\ -Y_5 \\ -Y_6 \end{bmatrix}$$

Each target in excess of the minimum of six adds two equations to the set. The resulting over-determined linear set of equations is solved in a least-squares sense for the DLT coefficients $L_1$-$L_{11}$. Because this set of equations is often ill-conditioned, it usually is solved by singular value decomposition.

Analysis of images of the test article begins by defining in 3D object-space a structured surface grid, S(x, y, z) 27, that conforms to the initial shape of the test article 15, which is known. Test articles often have simple shapes (e.g., flat, spherical, cylindrical) for which it is easy to define a surface grid. Each node of the surface grid defines a "virtual target" that will be tracked through the sequence of images from both cameras. The 2D image-plane coordinates of each node of the grid in the first image from each camera are determined using Eq. (1). This method of defining measurement points is a significant advance over previous art because it allows complete freedom in choosing the density and distribution of measurement points and does not require any modification to the test article. FIG. 2 shows a surface grid 27 that has been mapped to the first image from each camera, 28A and 28B, using Eq. (1).

Figure 5:
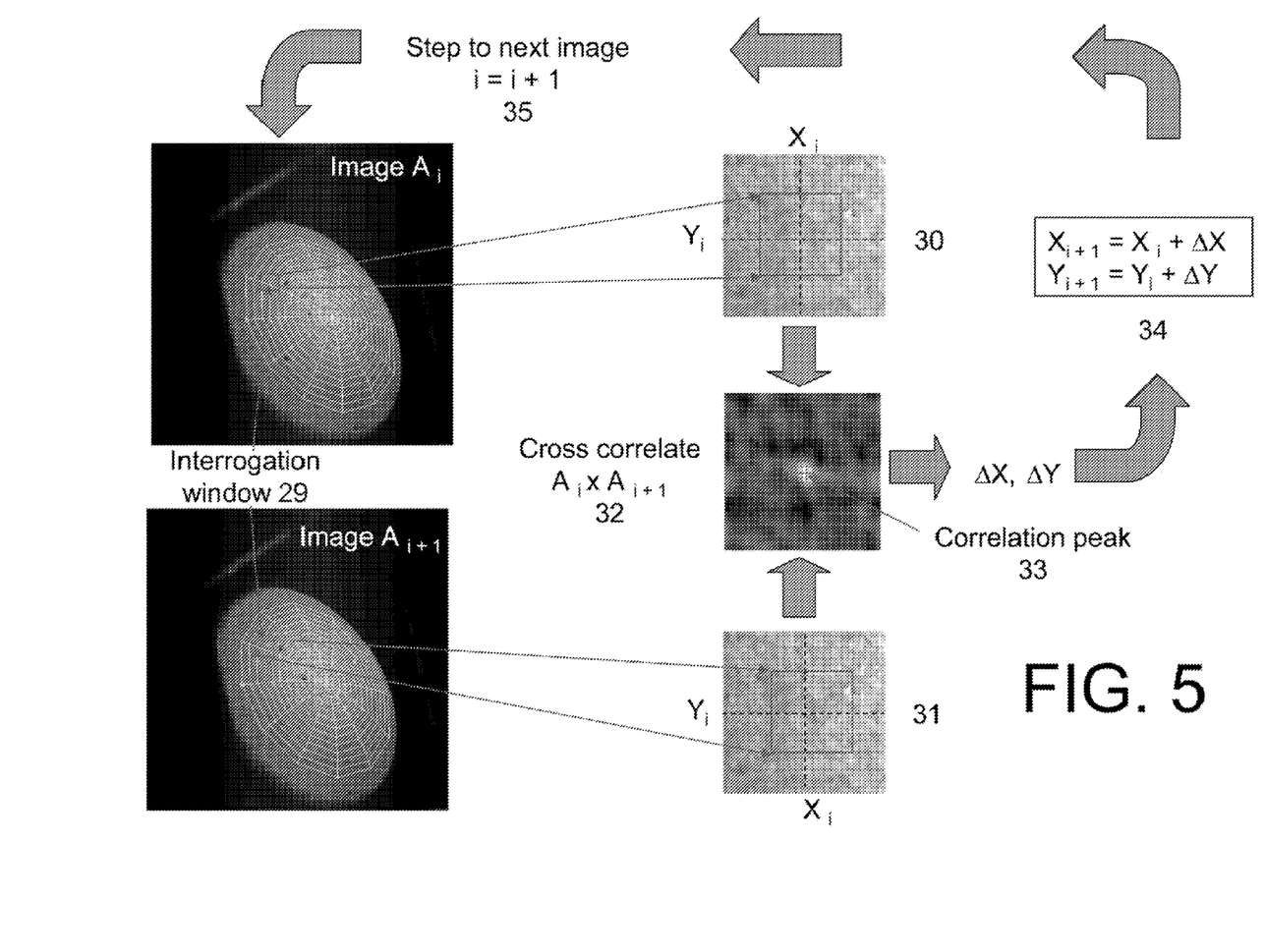
FIG. 5 is a schematic representation of the algorithm, successive image cross correlation, used to track measurement points in the image sequence from the first camera.

After the measurement points have been defined in the first image, 28A and 28B, from each camera, the measurement points are tracked throughout the sequence of images from both cameras. For one of the cameras, this is accomplished by successive image cross correlation, as illustrated in FIG. 5. Beginning with the first image in the sequence, a small, m-by-n pixel rectangular interrogation window 29 is defined with its center at the first measurement point. Image intensity data within this window from the first 30 and second 31 images are cross correlated.

It is usually advantageous to high-pass-filter the image-intensity data within the interrogation windows before performing the cross correlation. This reduces the effect of large-scale surface features on the correlation function. High-pass filtering is accomplished by subtracting from the intensity of each pixel the average intensity of an i×i array of pixels (i odd) centered on that pixel; see Weeks, Jr., A. R., "Fundamentals of Electronic Image Processing," SPIE Optical Engineering Press, Bellingham, Wash., 1996. Other forms of image processing may also by used including histogram equalization and image binarization.

Image cross correlation is implemented by first computing the two-dimensional real-to-complex fast Fourier transform (FFT) of each image within the interrogation window. Next, the complex FFT of the first image is multiplied by the complex conjugate of the FFT of the second image. Finally, the cross-correlation function is the complex-to-real inverse FFT of this product. The cross-correlation function is normalized by the product of the standard deviations of the image intensities within the interrogation window, which yields correlation values between ±1.0.

The result of this procedure is in an m-by n-valued correlation function 32. The correlation function 32 will have a well-defined peak 33, if the first and second images are similar within the window. The peak will be offset from the center of the window by the 2D image-plane offset of the second image relative to the first image within the window. Therefore, the position of the correlation peak can be used to determine the local offset of the second image relative to the first, and this offset is used to update the position of the measurement point 34 in the second image. The position of the peak of the correlation function is determined with sub-pixel accuracy using a three-point Gaussian peak finder in the vertical (Y) and horizontal (X) directions; see Raffel, M., Willert, C. and Kompenhans, J., "Particle Image Velocimetry, A Practical Guide," Springer-Verlag, Berlin, 1998. Differences between the first and second images within the window other than an offset appear as noise in the cross correlation function.

After this procedure has been applied at the first measurement point, it is repeated at all other measurement points using data from the first and second images within interrogation windows centered on each point. This results in updated image-plane coordinates of each measurement point in the second image in the sequence.

Image-plane coordinates of the measurement points in the third (and each subsequent) image are determined by stepping forward one image in the sequence 35 and repeating the procedure. For example, intensity data from the second and third images within each interrogation window (where the window is centered on the updated coordinates of each measurement point) are cross correlated to determine the image-plane offsets of each measurement point between the second and third images. These offsets are used to update the positions of the measurement points in the third image. After stepping through all the images, this procedure yields the image-plane coordinates of every measurement point in every image in the sequence from one camera.

Figure 6:
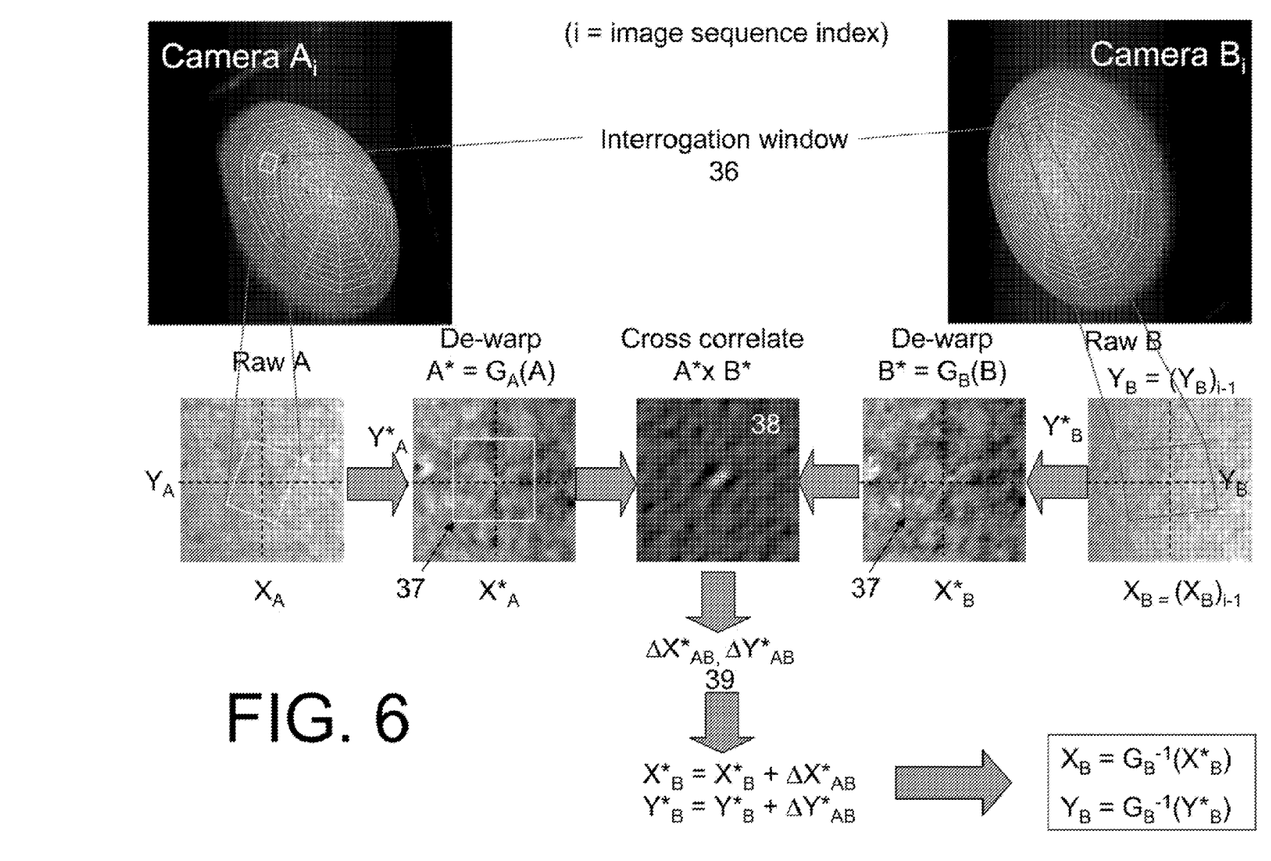
FIG. 6 is a schematic representation of the algorithm, camera-to-camera cross correlation, used to track measurement points in the image sequence from the second camera.
Figures 7, 7A:
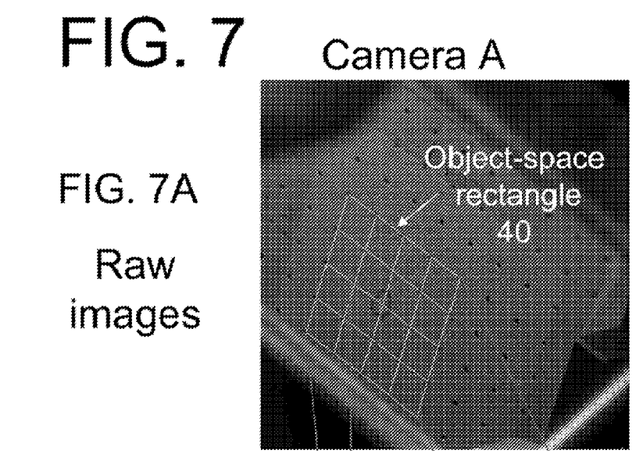
FIGS. 7A-7D show the effect of global de-warp transformations (one for each camera) on raw images of a two-dimensional calibration plate.
Figure 7B:
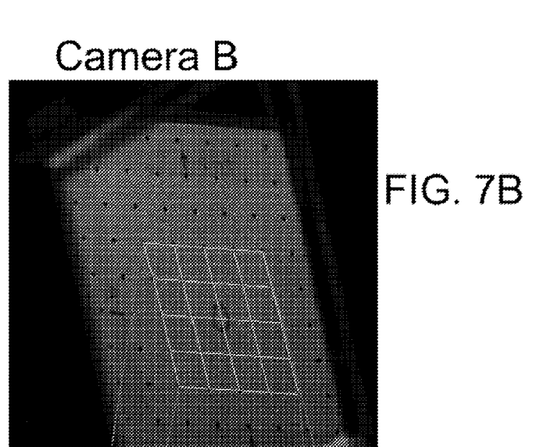
Figure 7C:
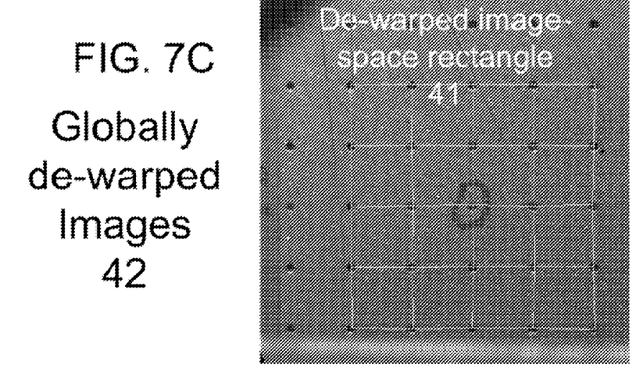
Figure 7D:
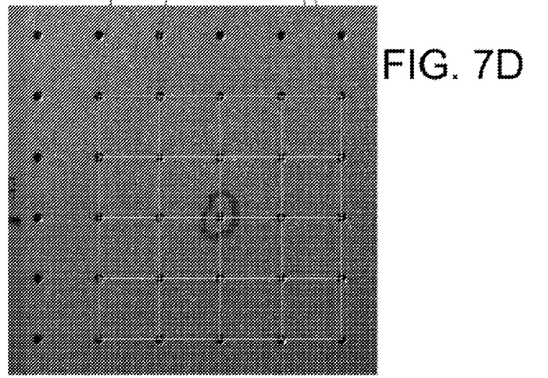

A different procedure is used to locate measurement points in the images from the second camera, as illustrated in FIG. 6. This is necessary to enforce or implement the requirement that corresponding measurement points in the images from the two cameras correspond to the same object-space point on the model (i.e., a measurement point in the image from one camera must lie on the same surface feature of the test article in the corresponding image from the other camera). To accomplish this, intensity data from each image from the second camera are cross correlated with data from the corresponding image from the first camera and NOT with the next image from the second camera.

If raw image data from the two cameras are cross-correlated directly, the correlation function is swamped by noise due to differences in perspective between the two cameras, i.e., the images of the model do not appear similar due to differences in perspective, even when both images show the same features of the model. Therefore, images from both cameras are "de-warped" to minimize differences in perspective before they are cross correlated. The preferred method for de-warping images is to determine a different, "local," de-warp function at each measurement point. The local de-warping function (G in FIG. 6) creates a view of the local surface of the model as if it were seen from directly overhead. An alternate method is to determine a single, "global," de-warp function for each camera. The global de-warp function approximates the view of the test article as seen from a single common vantage point, e.g., from a point on the axis of the arcjet.

For the local method, the de-warp transformation at each point is determined by first defining in 3D object-space a square interrogation window 36 that lies on the surface of the test article with its center at the grid-point of interest. The corners of this window are then projected into the images of both cameras using Eq. (1). The de-warp transformation for each camera maps the corners of the interrogation window (X,Y) in the corresponding image to the corners of a square (X*,Y*) 37; i.e., the shape of the interrogation window as seen from directly overhead. This is accomplished using a first-order projective transformation, which is exactly defined by coordinates at the four corners, as discussed in Bell, J. H., and McLachlan, B. G., "Image Registration for Pressure-Sensitive Paint Applications," Experiments in Fluids Vol. 22, No. 1, November 1996, pp. 78-86 and Bell, J. H., Schairer, E. T., Hand, L. A., and Mehta, R. D., "Surface Pressure Measurements Using Luminescent Coatings," Annual Review of Fluid Mechanics, Vol. 33, 2001, pp. 155-206:

$$X = \frac{a_2 X^* + a_3 Y^* + a_4}{a_0 X^* + a_1 Y^* + 1} \quad (3)$$

$$Y = \frac{a_5 X^* + a_6 Y^* + a_7}{a_0 X^* + a_1 Y^* + 1}$$

The de-warp transformation for each camera is applied to the corresponding raw-image data within the interrogation window. Then the transformed data from both cameras are cross correlated, as indicated at 38. This yields the local offset, in de-warped image-plane coordinates, of image B relative to image A: $\Delta X^* = X^*_B - X^*_A$ and $\Delta Y^* = Y^*_B - Y^*_A$ 39. The corresponding raw image-plane coordinates in image B ($X_B$, $Y_B$) are found by substituting $X^* = X^*_A + \Delta X^*$ and $Y^* = Y^*_A + \Delta Y^*$ into Eq. (3).

For the global de-warp method, illustrated in FIGS. 7A-7D, a separate global transformation is computed for each camera and is used to correct for perspective distortion at all measurement points. Otherwise, the procedure is the same as for the local method. The global de-warp transformation for each camera is found by defining four targets on a calibration plate that form a rectangle in 3D object-space 40 and mapping the raw 2D image-plane coordinates of these targets, which appear as a quadrilateral in the image, to a rectangle in de-warped image-plane 41 using the first-order projective transformation, Eq. (3). The globally de-warped images 42 approximate views from a point on a line perpendicular to the plate.

Local de-warping is a significant advance over the previous art (global de-warping) because it more completely corrects for perspective distortion of flat surfaces and also corrects for curvature of non-flat surfaces. The local correction is more accurate because it accounts for changes in perspective distortion at each measurement point whereas the first-order global de-warp transformation only provides an average correction. The accuracy of the global method may be improved by using higher-order transformations; see Willert, C., "Stereoscopic Digital Particle Image Velocimetry for Application in Wind Tunnel Flows," Measurement Science and Technology, Vol. 8, No. 12, December 1997, pp. 1465-1479.

Once a measurement point is located in the images of both cameras, the object-space coordinates of the point are computed using the camera calibration coefficients. Each camera contributes two equations to a linear set that is solved in a least-squares sense for the 3D object-space coordinates (x, y, z):

$$\begin{bmatrix} X^A L_9^A - L_1^A & X^A L_{10}^A - L_2^A & X^A L_{11}^A - L_3^A \\ Y^A L_9^A - L_5^A & Y^A L_{10}^A - L_6^A & Y^A L_{11}^A - L_7^A \\ X^B L_9^B - L_1^B & X^B L_{10}^B - L_2^B & X^B L_{11}^B - L_3^B \\ Y^B L_9^B - L_5^B & Y^B L_{10}^B - L_6^B & Y^B L_{11}^B - L_7^B \end{bmatrix} \begin{bmatrix} x \\ y \\ z \end{bmatrix} = \begin{bmatrix} L_4^A - X^A \\ L_8^A - Y^A \\ L_4^B - X^B \\ L_8^B - Y^B \end{bmatrix} \quad (4)$$

where ($X^A$, $Y^A$) and ($X^B$, $Y^B$) are the 2D image-plane coordinates of the point in images A and B, respectively and $L_{1-11}^A$ and $L_{1-11}^B$ are the calibration coefficients for cameras A and B, respectively. Repeating this calculation at each node of the surface grid yields the instantaneous 3D shape of the surface of the model. To prevent measurement points from being convected laterally along the surface of the test article, only the axial (z) coordinates of the surface grid are updated at each time step (i.e., image sequence), and the lateral coordinates (x and y) remain fixed at their initial values. New image-plane coordinates of the surface grid for each camera are computed from the updated 3D object-space grid using Eq. (1).

Repeating this procedure for each pair of images in the image sequences from the two cameras yields the time-history of the shape of the surface. Recession is usually defined as displacement in the axial (z) direction.

Figure 8:
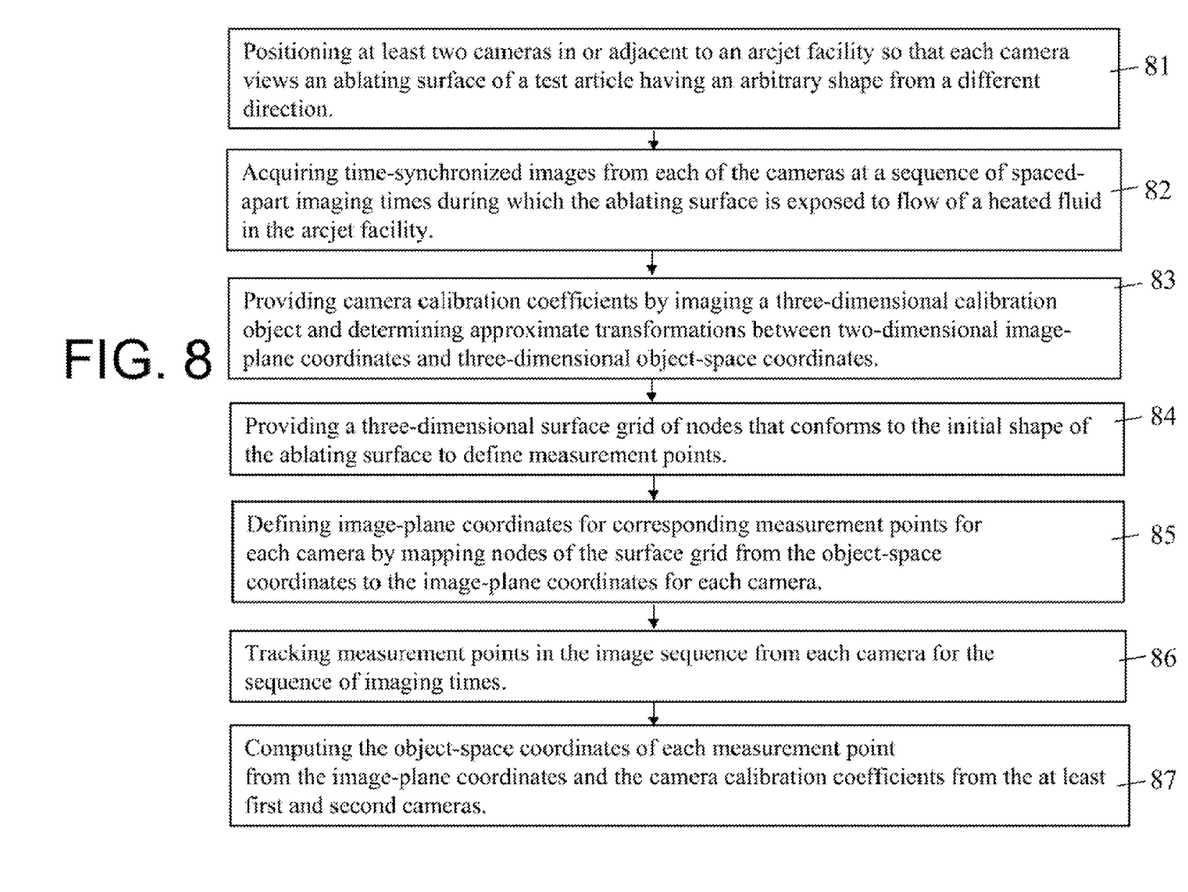
FIG. 8 is a flow chart of a procedure for practicing the invention.

FIG. 8 sets forth a flow chart of a procedure for practicing an embodiment of the invention. The process steps are the following, not necessarily in that order:

step 81: positioning at least first and second cameras in or adjacent to an arcjet facility so that each camera views an ablating surface of a test article, having an arbitrary shape, from a different direction;

step 82: acquiring time-synchronized images of the ablating surface from each of the cameras at a sequence of spaced apart imaging times during which the ablating surface is exposed to flow of a heated fluid in the arcjet facility;

step 83: providing camera calibration coefficients by imaging a three dimensional calibration object and determining approximate transformations between two dimensional image-plane coordinates and three dimensional object-space coordinates;

step 84: providing a three dimensional surface grid of nodes that conforms to the initial shape of the ablating surface, to define measurement points;

step 85: defining image-plane coordinates for corresponding measurement points for each camera by mapping the nodes of the surface grid from the object-space coordinates to the image-plane coordinates for each camera;

step 86: tracking measurement points in the image sequence from each camera for the sequence of imaging times; and step 87: computing the object-space coordinates of each measurement point from the image-plane coordinates and the camera calibration coefficients for the at least first and second cameras.

While the specific embodiments of the photogrammetric recession measurement instrument have been illustrated and described for measuring recession of ablative materials in arcjets in accordance with the present invention, other applications of the instrument will become apparent to those skilled in the art without departing from the scope of the invention. The instrument can be used to measure the time history of the shape of any textured surface that can be imaged from at least two directions. Shape changes may be due to erosion and/or accretion of material or deformation of the surface, due to mechanical and/or thermal effects.

Variations in the method are also within the scope of the invention, for example: the use of more than two cameras to image the test article; the use of alternate transformations between 2D image-plane and 3D object-space; and the use of higher-order de-warp transformations.

What is claimed is:

1. A system for measuring recession of an ablative surface during testing in an arcjet facility, the system comprising:
   (1) at least first and second cameras, positioned in or adjacent to an arcjet facility so that each camera views an ablating surface of a test article, having an arbitrary shape, from a different direction, and so that each of the at least first and second cameras acquires time-synchronized images of the ablating surface at a sequence of spaced apart imaging times during which the ablating surface is exposed to flow of a heated fluid in the arcjet facility and thereby undergoes ablation;
   (2) a calibration mechanism for providing camera calibration coefficients for each of the at least first and second cameras by imaging a three dimensional calibration object and determining approximate transformations between two dimensional image-plane coordinates and three-dimensional physical object-space coordinates;
   (3) a three dimensional surface grid of nodes that conforms to an initial shape of the ablating surface, to define measurement points on the ablating surface; and
   (4) a computer that is programmed:
      (a) to define image-plane coordinates for corresponding measurement points for each of the at least first and second cameras by mapping the nodes of the surface grid from the physical object-space coordinates to the image-plane coordinates for each of the at least first and second cameras;
      (b) to track measurement points from each of the at least first and second cameras for the sequence of imaging times; and
      (c) to compute the physical object-space coordinates of each measurement point from the image-plane coordinates and the camera calibration coefficients for the at least first and second cameras, to thereby estimate recession of the ablating surface.

2. The system according to claim 1, wherein said images of said ablating surface are acquired by a process comprising fitting said at least first and second cameras with band-pass interference filters to improve at least one of sharpness and contrast of said images by eliminating chromatic aberration.

3. The system according to claim 1, wherein said initial shape of said ablating surface is at least one of a portion of a plane, a portion of a sphere and a portion of a cylinder.

4. The system according to claim 1, wherein no targets and no fiducial marks are provided for said ablating surface, and appearance of the ablating surface changes continually as ablation proceeds.

5. The system according to claim 1, wherein said measurement points are tracked for said first camera by defining a small, rectangular interrogation window, centered on each of said measurement points, and providing high-pass filtering of image intensity data within the window.

6. The system according to claim 5, wherein said step of tracking said measurement points is accomplished for said first camera by successive cross correlation of filtered image intensity data within said small interrogation window centered on each measurement point.

7. The system according to claim 1, wherein said computer is further programmed to track said measurement points for said second camera by applying independent global, de-warp transformations to images from said first camera and from said second camera before performing cross correlation between said first and second cameras.

8. The system according to claim 1, wherein said computer is further programmed to track said measurement points for said second camera by applying a different, local, de-warp transformation to image data from said first and second cameras at each measurement point before performing cross correlation between said first and second cameras, where the local de-warp transformation approximates a view of said ablating surface as seen from a point on a line perpendicular to said ablating surface at said measurement point, and a local transformation is applied only to a portion of said image that is within said interrogation window.

9. The system according to claim 1, wherein said computer is further programmed to track said measurement points by constraining each of said measurement points to remain at a fixed (x,y) location in said physical object-space.

* * * * *